United States Patent [19]
Emilsson et al.

[11] Patent Number: 5,924,527
[45] Date of Patent: Jul. 20, 1999

[54] TREAD BRAKE UNIT

[75] Inventors: Fred Emilsson, Trelleborg; Per Walter, Flyinge, both of Sweden

[73] Assignee: Sab Wabco AB, Landskrona, Sweden

[21] Appl. No.: 08/977,609

[22] Filed: Nov. 25, 1997

[30] Foreign Application Priority Data

Nov. 25, 1996 [SE] Sweden .................................. 9604313

[51] Int. Cl.⁶ ............................. F16D 65/14; B60T 11/10
[52] U.S. Cl. ......................... 188/153 R; 188/74; 188/217
[58] Field of Search ..................... 188/153 R, 153 A, 188/153 D, 236, 217, 220.1, 220.6, 221.1, 250 F, 206 R, 205 R, 203, 198, 197, 74–76, 235, 219.6; 92/129, 187, 188; 403/57, 58, 119, 121, 149, 157, 124

[56] References Cited

U.S. PATENT DOCUMENTS

| | | | |
|---|---|---|---|
| 3,205,980 | 9/1965 | Kettering et al. ........................ | 188/217 |
| 3,572,475 | 3/1971 | Persson et al. .......................... | 188/217 |
| 4,287,968 | 9/1981 | Stensson et al. .......................... | 188/74 |
| 5,242,037 | 9/1993 | Stjärne ................ | 188/206 R |
| 5,277,280 | 1/1994 | Stjärne ................ | 188/206 R |
| 5,799,757 | 9/1998 | Akamatsu et al. ........................ | 188/74 |

FOREIGN PATENT DOCUMENTS 1464791  11/1965  France ................ 188/153 R

*Primary Examiner*—Douglas C. Butler
*Attorney, Agent, or Firm*—Laurence R. Brown

[57] ABSTRACT

A tread brake unit for applying a brake block (3) against the tread of a rail vehicle wheel comprises a pneumatic cylinder (1) having a piston (9) with a piston rod (11). A block holder (2) for the brake block is pivotably connected to the piston rod by a pivot sleeve (19) rotatably attached in the end of the piston rod facing the block holder, which is provided with a circular surface (25) for engagement with the pivot sleeve, a structure (20, 22, 23) being provided for keeping the block holder connected to the pivot sleeve.

4 Claims, 3 Drawing Sheets

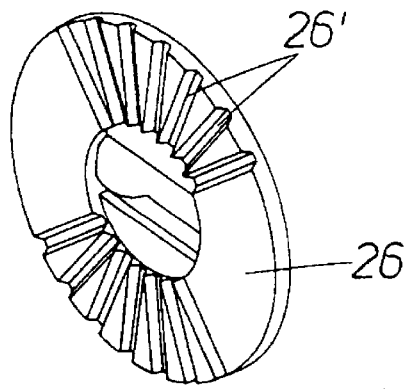
Fig.8
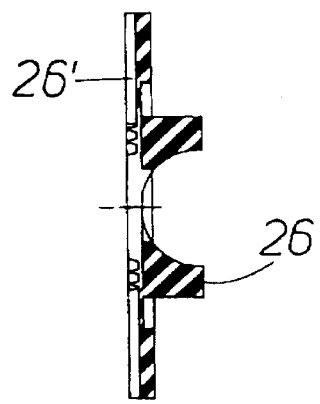
Fig.9
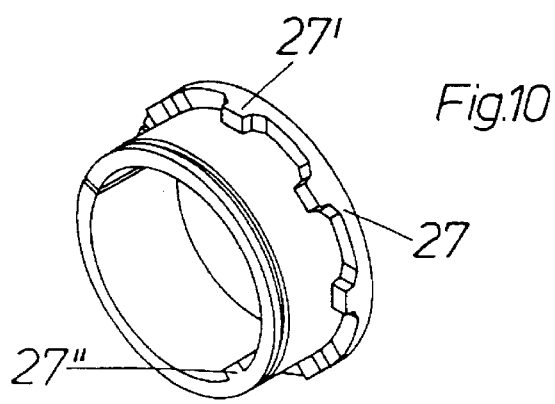
Fig.10
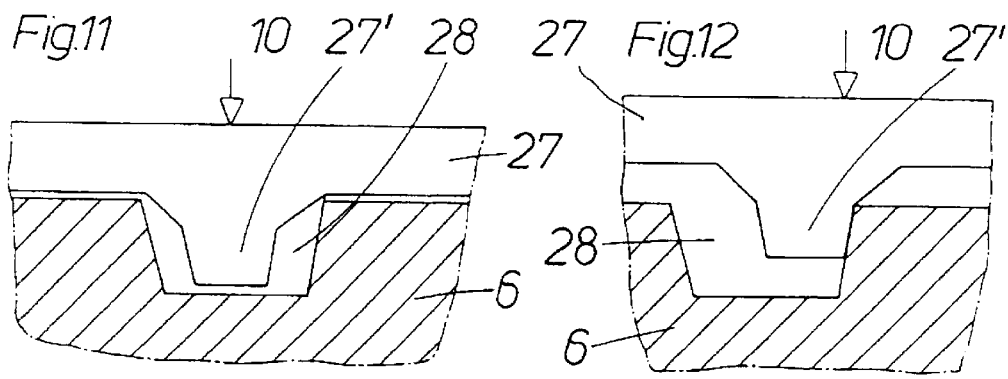

TREAD BRAKE UNIT

TECHNICAL FIELD

The present invention relates to a tread conditioning unit for applying a brake block against a tread of a rail vehicle wheel, comprising a fluid operated cylinder having a piston with a piston rod.

1. Background of the Invention

It is well known in the rail industry that the proper adhesion between rail vehicle wheels and the rails are of great importance both for driving and for braking. With block braked wheels the treads will be kept free from leaves, ice and the like and conditioned for optimum adhesion. However, there is a growing tendency to employ disc braking, in which case no tread conditioning will be accomplished, unless separate tread conditioning units or scrubber units are used.

Many examples of such units are known in the art. Such a unit is suspended from a suitable portion of the rail vehicle undercarriage, and certain relative movements between the unit and the wheel tread have to be taken care of. Units known in the art have failed to provide appropriate means for accomplishing this, and it is accordingly the main object of the invention to provide safe, sturdy but yet cheap means for allowing pivotal movements of the block of a tread conditioning unit of the kind described above.

2. The Invention

This is according to the invention accomplished in that a block holder for the brake block is pivotably connected to the piston rod by means comprising a pivot sleeve rotatably attached in the end of the tubular piston rod facing the block holder, which is provided with a circular surface for engagement with the pivot sleeve, means being provided for keeping the block holder connected to the pivot sleeve.

In a practical embodiment the connection means comprise a screw extending through a bore in the block holder, further through an opening in the pivot sleeve and into a threaded hole in a retaining pin extending through openings facing each other in the end of the tubular piston rod and through the pivot sleeve.

A rubber bushing may be arranged between the block holder and the end of the piston rod for holding the block holder in a vertical position during application and for providing vibration damping.

The block holder of the unit may under certain circumstances be exposed to shock forces from the wheel flanges. The piston rod can deflect elastically under these torques and be returned to its original position in that it is guided in an end flange of the unit housing by means of a guide bushing, which is spring biassed into engagement with the end flange and has axial teeth engaging notches in the end flange, said teeth having steeper portions, so that after a relative movement between the end flange and the guide bushing a return force from the spring bias is exerted on the guide bushing.

BRIEF DESCRIPTION OF THE DRAWINGS

The invention will be described in further detail below reference being made to the accompanying drawings, in which FIG. 8 is a perspective view of a rubber bushing in the unit of FIG. 1, FIG. 9 is a cross-sectional view through the rubber bushing of FIG. 8, FIG. 10 is a perspective view of a guide bushing in the unit of FIG. 1, and FIGS. 11 and 12 are schematic illustrations of the interaction in two positions between an axial teeth of the guide bushing shown in FIG. 10 and a corresponding notch in a base flange of the unit.

DETAILED DESCRIPTION OF A PREFERRED EMBODIMENT

Figure 1:
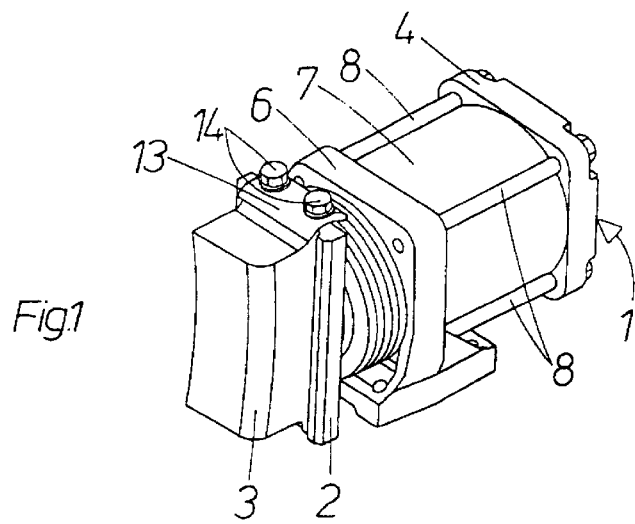
FIG. 1 is a perspective view of a tread conditioning unit according to the invention.
Figure 2:
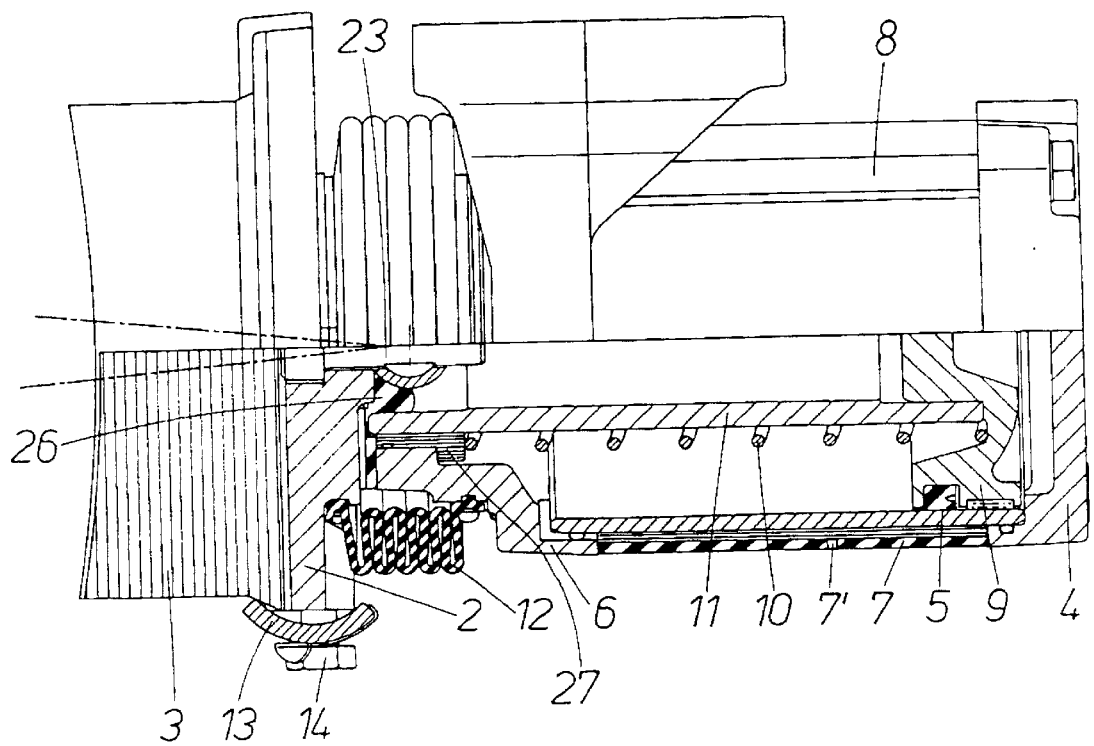
FIG. 2 is a side view, partly in section, of the unit of FIG. 1.

A tread conditioning unit as shown in perspective in FIG. 1 and in a sectioned side view in FIG. 2 is to be mounted in the undercarriage of a normally disc braked rail vehicle at a vehicle wheel, whose tread is to be conditioned from time to time for the main purpose of keeping the adhesion between the wheel and the rail on which it rolls at an appropriate level.

Generally speaking, such a unit is comprised of a fluid operated, normally pneumatic cylinder 1 and a block holder 2 provided with a brake block 3 for engagement with a rail vehicle wheel when applied. The unit is in FIG. 1 shown standing, but normally it is suspended from a suitable part of the vehicle undercarriage.

Referring now to FIG. 2, the cylinder 1 may be constructed of an end flange 4, a cylinder tube 5 and a base flange 6, which all may be made of aluminium. In order to protect the cylinder tube 5 a gaiter 7 of rubber or plastic may enclose the tube 5. This gaiter 7 may be provided with one or several draining holes 7'. The different cylinder parts are held together by screws 8.

A piston 9, provided with ordinary sealings, is axially movable in the cylinder tube 5 under the action of fluid pressure, normally pneumatic pressure admitted to the right in FIG. 2. A return spring 10 is arranged around a tubular piston rod 11 attached to the piston 9.

The block holder 2 is pivotably connected to the piston rod 11 in a way to be further described. A bellows 12 is arranged between the base flange 6 and the block holder 2.

The brake block 3 is removably attached to the block holder 2 in a conventional way, such as by means of a retainer plate 13 and screws 14.

Figure 3:
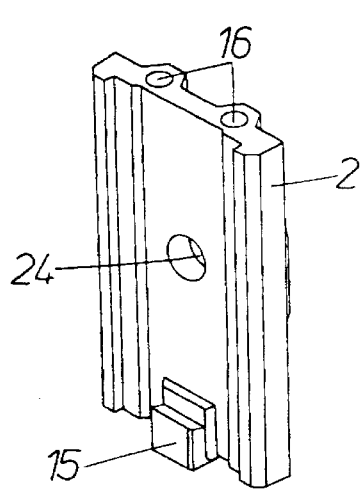
FIG. 3 is a perspective view of a block holder for the unit of FIG. 1.

FIG. 3 shows the block holder 2 from the brake block side. It has a lower attachment 15 for the brake block 3 and threaded holes 16 for the screws 14. These can also be seen in FIG. 4.

Figure 5:
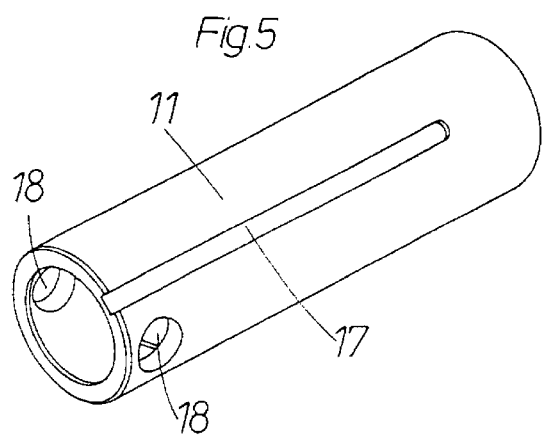
FIG. 5 is a perspective view of a piston rod in the unit of FIG. 1.
Figure 6:
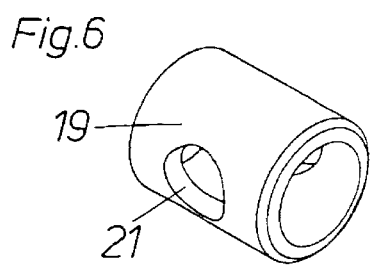
FIG. 6 is a perspective view of a pivot sleeve in the unit of FIG. 1.
Figure 7:
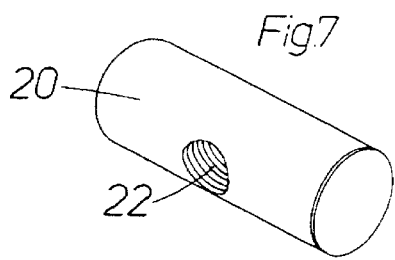
FIG. 7 is a perspective view of a retaining pin in the unit of FIG. 1.

FIG. 5 shows the tubular piston rod 11, which is provided with a longitudinal groove 17 for guiding engagement with a projection 27" in a guide bushing 27 in the base flange 6, the bushing to be described below under reference to FIGS. 10–12. At its forward end facing the block holder 2 the piston rod is provided with two coaxial circular side openings 18. A pivot sleeve 19, shown in FIG. 6, can be inserted in the tubular piston rod 11 in axial line with the openings 18, and a retaining pin 20, shown in FIG. 7, can be inserted through the openings 18 and the pivot sleeve 19.

The pivot sleeve 19 has an opening 21, and the retaining pin 20 has a threaded hole 22. A screw 23, FIG. 2, may be inserted from the brake block side of the block holder 2 through a bore 24 therein and further through the opening 21 in the pivot sleeve 19 and into the threaded hole 22 in the retaining pin 20 to be fastened therein.

Figure 4:
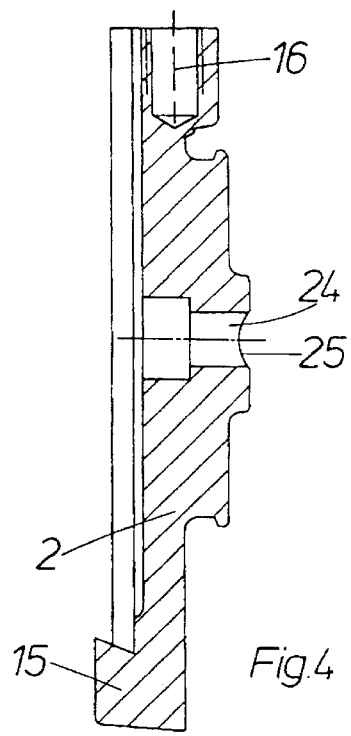
FIG. 4 is a section through the block holder of FIG. 3.

The rear side of the block holder 2 is—as shown in FIG. 4—around the bore 24 provided with a circular surface 25, against which the pivot sleeve 19 will be applied, with the result that the block holder 2 will be pivotably attached to the piston rod 11. The dimensioning is such that a vertical pivoting of ±5° is permitted for the block holder 2 so as to allow adaption to the actual position of the wheel in relation to the tread conditioning unit.

A rubber bushing 26 is arranged between the block holder 2 and the end of the piston rod 11. The bushing 26 is provided with radial grooves 26' for making it softer in the direction for the vertical pivoting of the block holder 2. The purpose of the rubber bushing 26 is to prevent the block holder 2 with its brake block 3 from assuming a deflected position or to "hang down" during an application but also generally to provide a damping for improving function and life-length at high vibration levels.

At each return after a conditioning application under the action of the return spring 10 the block holder 2 will come to rest against the rubber bushing 26, as illustrated in FIG. 2, so that vibrations will not affect the described pivotal connection.

A guide bushing 27, preferably of a plastic material, such as Delrin®, is arranged in the forward end of the base flange 6 around the piston rod 11, to which it is rotationally locked by means of an engagement between an internal projection 27" (FIG. 10) and the longitudinal groove 17 (FIG. 5). The forward end of the return spring 11 engages the guide bushing 27 and exerts its force thereon. As shown in FIG. 10, the bushing 27 has a number of circumferentially distributed, axial teeth 27' for cooperation with corresponding notches 28 in the base flange 6, as is schematically illustrated in FIGS. 11 and 12. Each notch 28 is somewhat larger in the circumferential direction than each tooth 27', which has steeper flank portions.

FIG. 11 illustrates a rest position, where the guide bushing 27 is held against the end flange 6 under the action of the spring 10, indicated by an arrow. If the guide bushing 27 is subjected to a torque from the block holder 2 with its brake block 3 via the piston rod 11 resulting from wheel flange movements, a relative position as depicted in FIG. 12 occurs. The parts will elastically return to their relative positions of FIG. 11 under the action of the force of the spring 10.

We claim:

1. A tread unit for applying a brake block (3) against a tread of a rail vehicle wheel, comprising a fluid operated cylinder (1) having a piston (9) with a tubular piston rod (11), characterized in that a block holder (2) for the brake block (3) is pivotably connected to the piston rod (11) by means comprising a pivot sleeve (19) rotatably attached in the end of the tubular rod facing the block holder, which is provided with a circular surface (25) for engagement with the pivot sleeve, and connection means (20, 22, 23) being provided for keeping the block holder connected to the pivot sleeve.

2. A unit according to claim 1, characterized in that the connection means comprise a screw (23) extending through a bore (24) in the block holder (2), further through an opening (21) in the pivot sleeve (19) and into a threaded hole (22) in a retaining pin (20) extending through openings (18) facing each other in the end of the tubular piston rod (11) and through the pivot sleeve (19).

3. A unit according to claim 1, characterized in that a rubber bushing (26) is arranged between the block holder (2) and the end of the piston rod (11) for holding the block holder in a vertical position during application and for providing vibration damping.

4. A unit according to claim 1, characterized in that the piston rod (11) is guided in an end flange (6) of the unit housing by means of a guide bushing (27), which is spring biassed into engagement with the end flange and has axial teeth (27') engaging notches (28) in the end flange, said teeth having steeper portions, so that after a relative rotation between the end flange and the guide bushing a return force from the spring bias is exerted on the guide bushing.

* * * * *